United States Patent
Shaheen

(10) Patent No.: US 7,852,825 B2
(45) Date of Patent: Dec. 14, 2010

(54) WIRELESS COMMUNICATION METHOD AND APPARATUS FOR PREVENTING NETWORK ACCESS BY MOBILE STATIONS WHICH SUPPORT AN INCOMPATIBLE INTERNET PROTOCOL VERSION

(75) Inventor: Kamel M. Shaheen, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 743 days.

(21) Appl. No.: 11/153,215

(22) Filed: Jun. 15, 2005

(65) Prior Publication Data

US 2006/0023712 A1 Feb. 2, 2006

Related U.S. Application Data

(60) Provisional application No. 60/592,872, filed on Jul. 30, 2004.

(51) Int. Cl.
 *H04W 4/00* (2009.01)
 *H04W 72/00* (2009.01)
 *H04L 12/28* (2006.01)
 *H04J 3/24* (2006.01)
 *H04J 3/22* (2006.01)

(52) U.S. Cl. ............... 370/349; 370/338; 370/389; 370/466; 455/432.2; 455/435.1; 455/450

(58) Field of Classification Search ........... 370/338, 370/349, 389, 466; 455/432.2, 435.1–435.3, 455/450

See application file for complete search history.

(56) References Cited

U.S. PATENT DOCUMENTS 6,219,549 B1 * 4/2001 Tat ......................... 455/434

| | | | |
|---|---|---|---|
| 6,445,690 B2 | 9/2002 | Sato et al. | |
| 6,484,210 B1 | 11/2002 | Adriano et al. | |
| 6,597,910 B1 * | 7/2003 | Ra | 455/433 |
| 6,636,502 B1 * | 10/2003 | Lager et al. | 370/352 |

(Continued)

OTHER PUBLICATIONS

Third Generation Partnership Project; "Technical Specification Group Services and System Aspects; Support of SMS and MMS Over Generic 3GPP IP Access"; Release 7, 3GPP TR 23.804 V1.2.0, Apr. 2005.

(Continued)

*Primary Examiner*—Vincent P Harper
*Assistant Examiner*—Ariel Balaoing
(74) *Attorney, Agent, or Firm*—Volpe and Koenig, P.C.

(57) ABSTRACT

A method and apparatus for determining whether attach procedures between a wireless transmit/receive unit (WTRU) and a network should proceed based on whether the internet protocol (IP) version, (i.e., packet data protocol (PDP) type), of the WTRU is compatible with the network. In one embodiment, the WTRU receives a network compatibility message from the network which indicates the network's IP version. If the network's IP version is determined by the WTRU to be compatible, the WTRU and the network proceed with the attach procedures. In another embodiment, the network receives an attach request message from the WTRU which indicates the IP version of the WTRU. If the IP version of the WTRU is determined by the network to be compatible, the network and the WTRU proceed with the attach procedures. For both embodiments, another network is selected if the IP versions of the WTRU and the network are not compatible.

18 Claims, 5 Drawing Sheets

U.S. PATENT DOCUMENTS

| | | |
|---|---|---|
| 6,681,259 B1 | 1/2004 | Lemilainen et al. |
| 6,687,252 B1 | 2/2004 | Bertrand et al. |
| 2003/0013450 A1 | 1/2003 | Wang et al. |
| 2004/0057441 A1 | 3/2004 | Li et al. |
| 2004/0106430 A1* | 6/2004 | Schwarz et al. .......... 455/552.1 |
| 2004/0148352 A1* | 7/2004 | Menon et al. ................ 709/205 |
| 2004/0192313 A1* | 9/2004 | Otting ......................... 455/446 |
| 2005/0002407 A1 | 1/2005 | Shaheen et al. |
| 2005/0003817 A1* | 1/2005 | Ormson et al. ........... 455/435.2 |
| 2005/0083899 A1* | 4/2005 | Babbar et al. ................ 370/342 |
| 2005/0148332 A1* | 7/2005 | Buckley et al. .......... 455/435.2 |
| 2006/0126547 A1* | 6/2006 | Puuskari et al. ............. 370/310 |

OTHER PUBLICATIONS

Third Generation Partnership Project, "Technical Specification Group Services and System Aspects; 3GPP System to Wireless Local Area Network (WLAN) Interworking; System Description"; 3GPP TS 23.234 V6.0.0 (Release 6), Mar. 2004.

Third Generation Partnership Project, "Technical Specification Group Services and System Aspects; Architectural Requirements", 3GPP TS 23.221 V6.3.0, Release 6, Jun. 2004.

Third Generation Partnership Project, "Technical Specification Group Services and System Aspects; 3GPP system to Wireless Local Area Network (WLAN) interworking; System description (Release 6)," 3GPP TS 23.234 V6.1.0 (Jun. 2004).

Third Generation Partnership Project, "Technical Specification Group Services and System Aspects; 3GPP system to Wireless Local Area Network (WLAN) interworking; System description (Release 6)," 3GPP TS 23.234 V6.4.0 (Mar. 2005).

Third Generation Partnership Project, "Technical Specification Group Services and System Aspects; Support of SMS and MMS over generic 3GPP IP access (Release 7)," 3GPP TR 23.804 V2.0.0 (May 2002).

Third Generation Partnership Project, "Technical Specification Group Services and System Aspects; Architectural requirements (Release 4)," 3GPP TS 23.221 V4.2.0 (Jun. 2002).

Third Generation Partnership Project, "Technical Specification Group Services and System Aspects; Architectural requirements (Release 5)," 3GPP TS 23.221 v5.10.0 (Jun. 2004).

Third Generation Partnership Project, "Technical Specification Group Services and System Aspects; Architectural requirements (Release 5)," 3GPP TS 23.221 V5.11.0 (Sep. 2004).

* cited by examiner

WIRELESS COMMUNICATION METHOD AND APPARATUS FOR PREVENTING NETWORK ACCESS BY MOBILE STATIONS WHICH SUPPORT AN INCOMPATIBLE INTERNET PROTOCOL VERSION

CROSS REFERENCE TO RELATED APPLICATION(S)

This application claims the benefit of U.S. Provisional Application No. 60/592,872, filed Jul. 30, 2004, which is incorporated by reference as if fully set forth herein.

FIELD OF INVENTION

The present invention is related to a wireless communication system including at least one communication network, (such as a serving general packet radio service (GPRS) support node (SGSN) or a public land mobile network (PLMN)), and at least one wireless transmit/receive unit (WTRU), each supporting a particular internet protocol (IP) version, (i.e., packet data protocol (PDP) type), used to establish IP connectivity, (i.e., PDP context). More particularly, the wireless communication system prevents the WTRU from accessing services provided by a network having an IP version that is not supported by the WTRU.

BACKGROUND

In conventional wireless communication systems, a WTRU can attach to any network regardless of the IP version that the WTRU supports. However, in order to establish IP connectivity, (i.e., PDP context), the IP version of the WTRU must be compatible with the IP version supported by the network. The network may include a Node-B which supports the same IP version as the network.

If the IP versions of the WTRU and the network are not compatible, the PDP context will be rejected, causing the WTRU to be denied IP multimedia subsystem (IMS) based services after a considerable delay period.

For example, the standard, (TS 23.221), mandates that a Third Generation Partnership Project (3GPP) IP Multimedia Subsystem (IMS) exclusively operates according to IP version 6 (v6). However, there will be an IP version 4 (v4) based IMS implementation for GPRS networks, and the 3GPP2 IMS is based on IP v4.

Hence, there is a need for the interworking between different versions of IMSs. A wireless communication method and system for reducing network search time and unnecessary traffic by barring IP incompatible WTRUs from accessing the network is desired.

SUMMARY

The present invention is a method and apparatus for determining whether attach procedures between a WTRU and a network should proceed based on whether the IP version, (i.e., PDP type), of the WTRU is compatible with the network. In one embodiment, the WTRU receives a network compatibility message from the network which indicates the network's IP version. If the network's IP version is determined by the WTRU to be compatible, the WTRU and the network proceed with the attach procedures. In another embodiment, the network receives an attach request message from the WTRU which indicates the IP version of the WTRU. If the IP version of the WTRU is determined by the network to be compatible, the network and the WTRU proceed with the attach procedures. For both embodiments, another network is selected if the IP versions of the WTRU and the network are not compatible.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
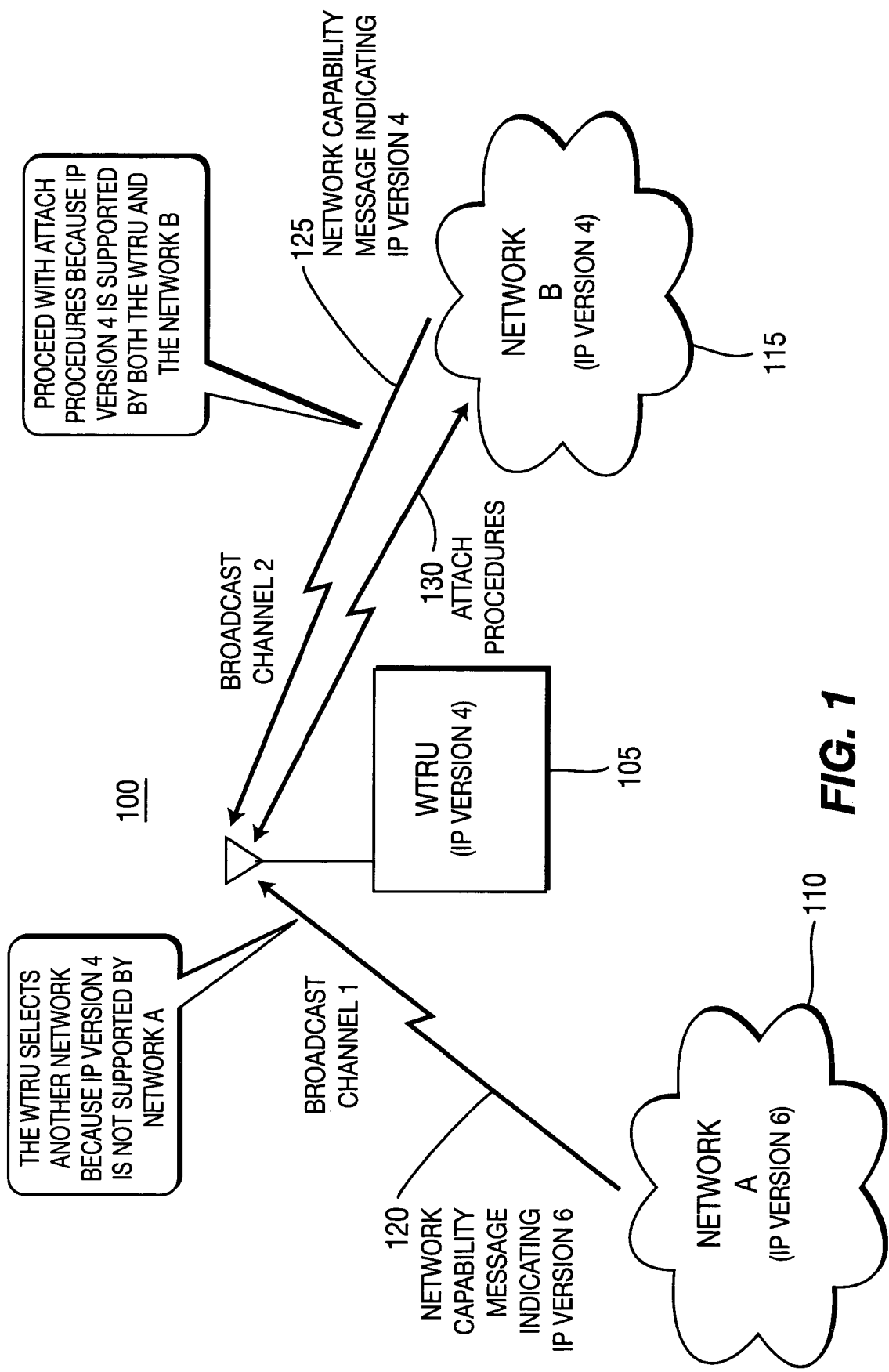
FIG. 1 is a block diagram of a wireless communication system including a WTRU which receives a message from at least one network over a broadcast channel indicating an IP version that the network supports in accordance with one embodiment of the present invention.

FIG. 1 is a block diagram of a wireless communication system 100 including a WTRU 105 which receives a network capability message 120, 125 from at least one network 110, 115 over a broadcast channel indicating a particular IP version that the network 110, 115 supports in accordance with one embodiment of the present invention. The network 110, 115 may include a Node-B (not shown) which supports the same IP version as the network 110, 115.

Figure 2:
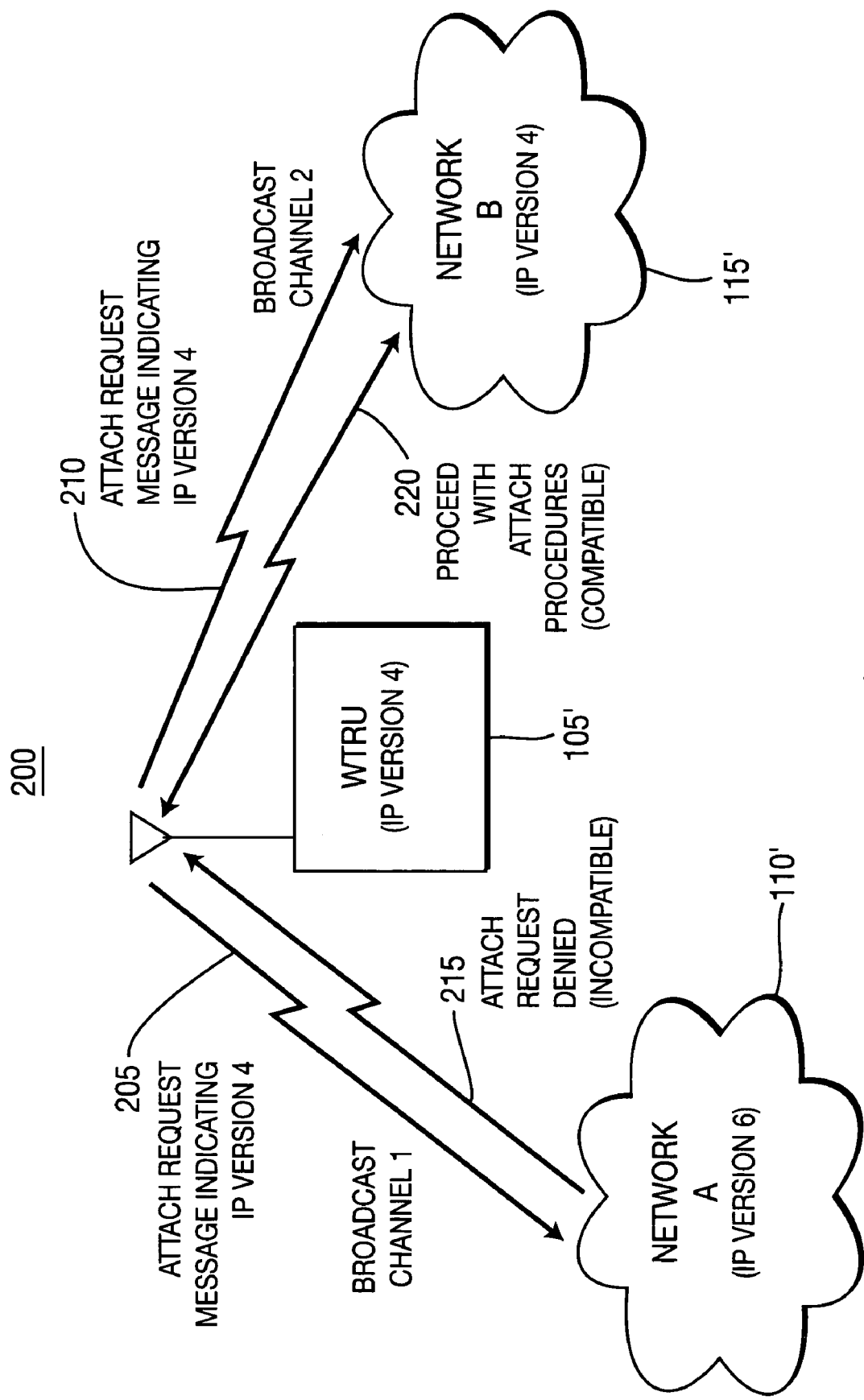
FIG. 2 is a block diagram of a wireless communication system including a WTRU which transmits an attach request message to at least one network indicating an IP version that the WTRU supports in accordance with another embodiment of the present invention.

FIG. 2 is a block diagram of a wireless communication system 200 including a WTRU 105' which transmits an attach request message 205, 210 to at least one network 110', 115' indicating an IP version that the WTRU 105' supports in accordance with another embodiment of the present invention. The network 110', 115' may include a Node-B (not shown) which supports the same IP version as the network 110', 115'.

Figure 3:
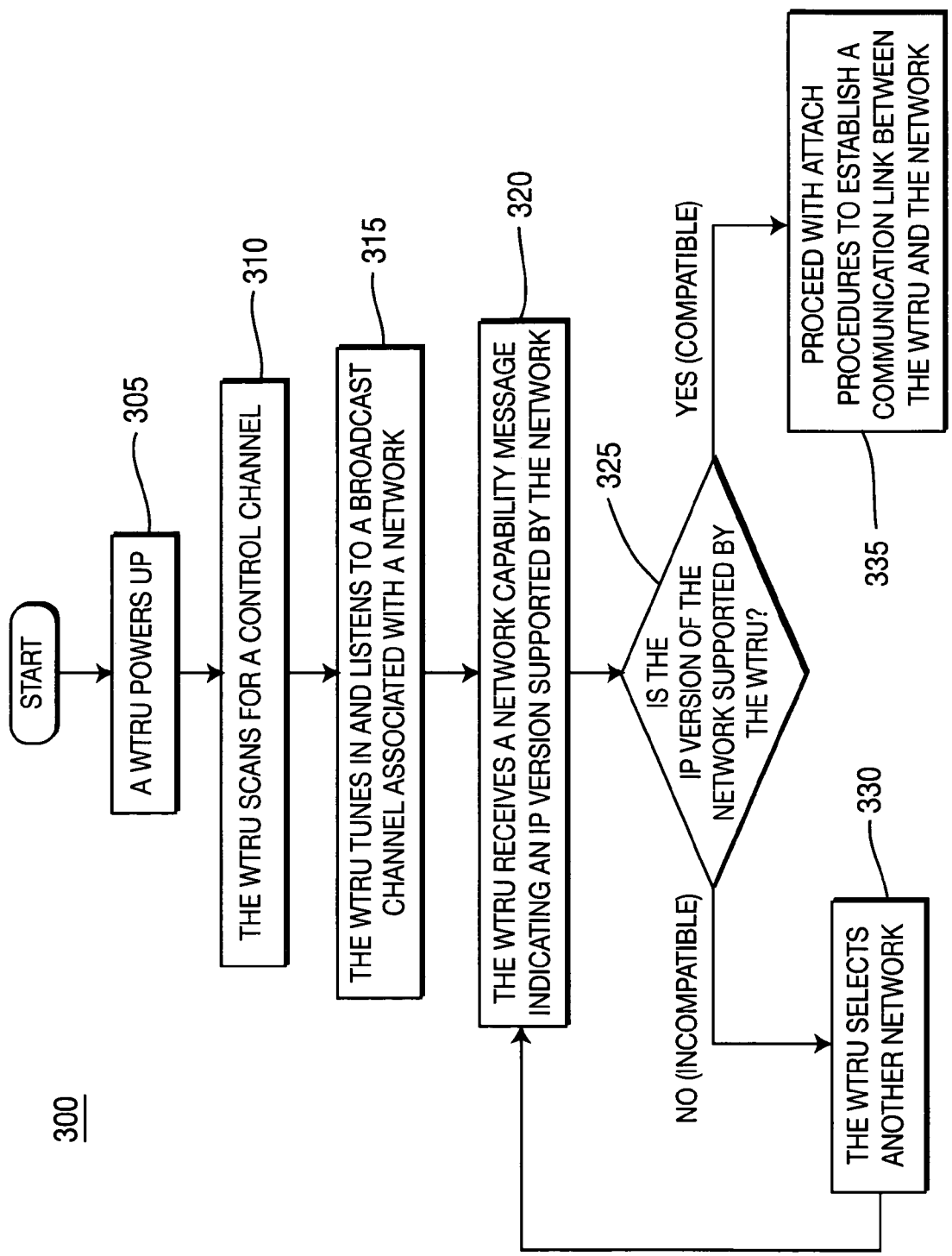
FIG. 3 is a flow diagram of a process including method steps implemented by the wireless communication system of FIG. 1.

FIG. 3 is a flow diagram of a process 300 including method steps implemented by the wireless communication system 100. Referring to FIGS. 1 and 3, when the WTRU 105 powers up (step 305), the WTRU 105 scans for a control channel (step 310) and tunes in and listens to a first broadcast channel in the control channel associated with a first network 110 (step 315).

The WTRU 105 receives a network capability message 120 sent by the first network 110 over the first broadcast channel indicating a particular IP version, (i.e., PDP type), supported by the first network 110 (step 320). The network capability message 120 may include a field having two (2) bits which represent a PDP type. For example, a field having a PDP type "00" may indicate that the first network 110 supports IP version 4, a field having a PDP type "01" may indicate that the first network 110 supports IP version 6, and a field having a PDP type "10" may indicate that the first network 110 supports both IP version 4 and IP version 6.

In step 325, the WTRU 105 determines whether the IP version of the first network 110 indicated in the network capability message 120 is the same as the IP version supported by the WTRU 105 (step 325).

If the IP version of the WTRU 105 is determined by the WTRU 105 not to be the same as, (i.e., is not compatible with), the IP version of the first network 110, the WTRU 105 selects a second network 115, (i.e., tunes in and listen to a second broadcast channel associated with the second network 115), in step 330, and the WTRU 105 receives a network capability message 125 sent by the second network 115 over the second broadcast channel indicating a particular IP version, (i.e., PDP type), supported by the second network 115 (step 320).

In one embodiment, the WTRU 105 may be directed by the first network 110 to select the second network 115, wherein the first network 110 has knowledge of another network that is compatible with the IP version of the WTRU 105. Alternatively, the first network 110 may broadcast a list of neighboring networks in an attempt to assist the WTRU 105 in finding a network that serves the same general area as the first network 110.

In another embodiment, the WTRU 105 may include a memory that stores a list of network identifiers. The WTRU 105 may scan the control channel, monitor a plurality of network broadcast channels and select a network having an identifier that matches one of the identifiers in the memory of the WTRU 105. If more than one match occurs, the WTRU 105 may rely on additional priority information stored in the memory that dictates a preference to select the network having the highest priority. If a match does not occur, the WTRU 105 continues to scan the control channel.

If the IP version of the first network 110 or the second network 115 is determined in step 325 by the WTRU 105 to be the same as, (compatible with), the IP version of the WTRU 105, the compatible network 110 or 115 and the WTRU 105 proceed with implementing attach procedures 130, (i.e., registration), to establish a communication link between the WTRU 105 and the compatible network 110 or 115.

Figure 4:
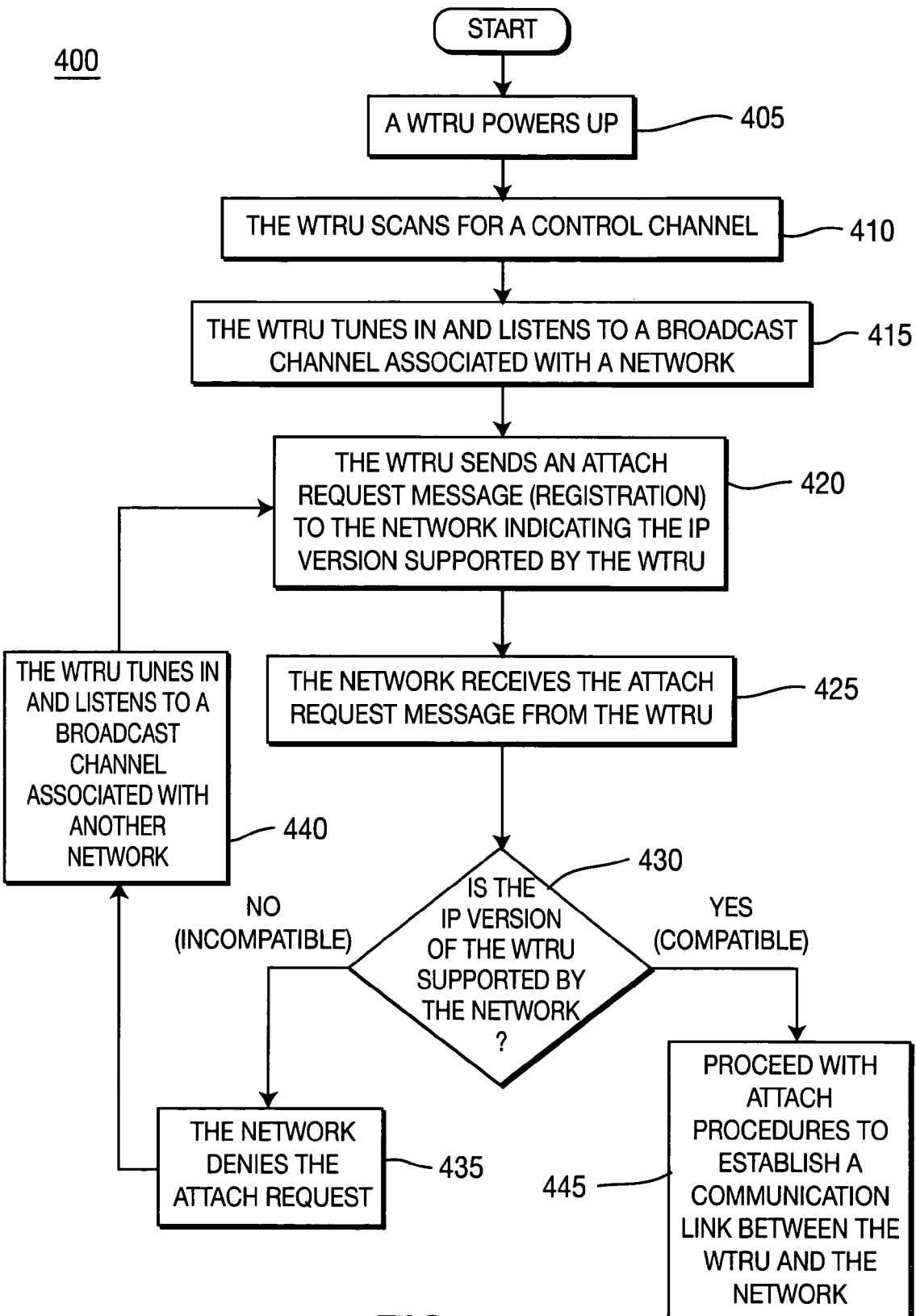
FIG. 4 is a flow diagram of a process including method steps implemented by the wireless communication system of FIG. 2.

FIG. 4 is a flow diagram of a process 400 including method steps implemented by the wireless communication system 200. Referring to FIGS. 2 and 4, when the WTRU 105' powers up (step 405), the WTRU 105' scans for a control channel (step 410) and tunes in and listens to a first broadcast channel in the control channel associated with a first network 110' (step 415). The WTRU 105' sends an attach request message 205 over the broadcast channel indicating a particular IP version, (i.e., PDP type), supported by the WTRU 105' to the first network 110' (step 420). The attach request message 205 may include a field having two (2) bits which represent a PDP type. For example, a field having a PDP type "00" may indicate that the WTRU 105' supports IP version 4, a field having a PDP type "01" may indicate that the WTRU 105' supports IP version 6, and a field having a PDP type "10" may indicate that the WTRU 105' supports both IP version 4 and IP version 6.

In step 425, the first network 110' receives the attach request message 205 from the WTRU 105' (step 425) and determines whether the IP version of the WTRU 105' indicated in the attach request message 205 is the same as the IP version supported by the first network 110' (step 430).

If the IP version of the WTRU 105' is determined by the first network 110' not to be the same as, (i.e., is not compatible with), the IP version of the first network 110,' the network 110' sends a message 215 to the WTRU 105' indicating that the attach request has been denied (step 435). The WTRU 105' then tunes in and listens to a second broadcast channel associated with a second network 115' in step 440. The WTRU 105' may be directed by the first network 110' to select the second network 115', wherein the first network 110' has knowledge of another network that is compatible with the IP version of the WTRU 105'.

In one embodiment, the WTRU 105' may be directed by the first network 110' to select the second network 115', wherein the first network 110' has knowledge of another network that is compatible with the IP version of the WTRU 105'. Alternatively, the first network 110' may broadcast a list of neighboring networks in an attempt to assist the WTRU 105' in finding a network that serves the same general area as the first network 110'.

In another embodiment, the WTRU 105' may include a memory that stores a list of network identifiers. The WTRU 105' may scan the control channel, monitor a plurality of network broadcast channels and select a network having an identifier that matches one of the identifiers in the memory of the WTRU 105'. If more than one match occurs, the WTRU 105' may rely on additional priority information stored in the memory that dictates a preference to select the network having the highest priority. If a match does not occur, the WTRU 105' continues to scan the control channel.

If the IP version of the WTRU 105' is determined in step 430 by the network 110' or the network 115' to be network compatible, the WTRU 105' and the compatible network 110' or 115' proceed with attach procedures 220, (i.e., registration), to establish a communication link between the WTRU 105' and the compatible network 110' or 115' (step 445).

Figure 5:
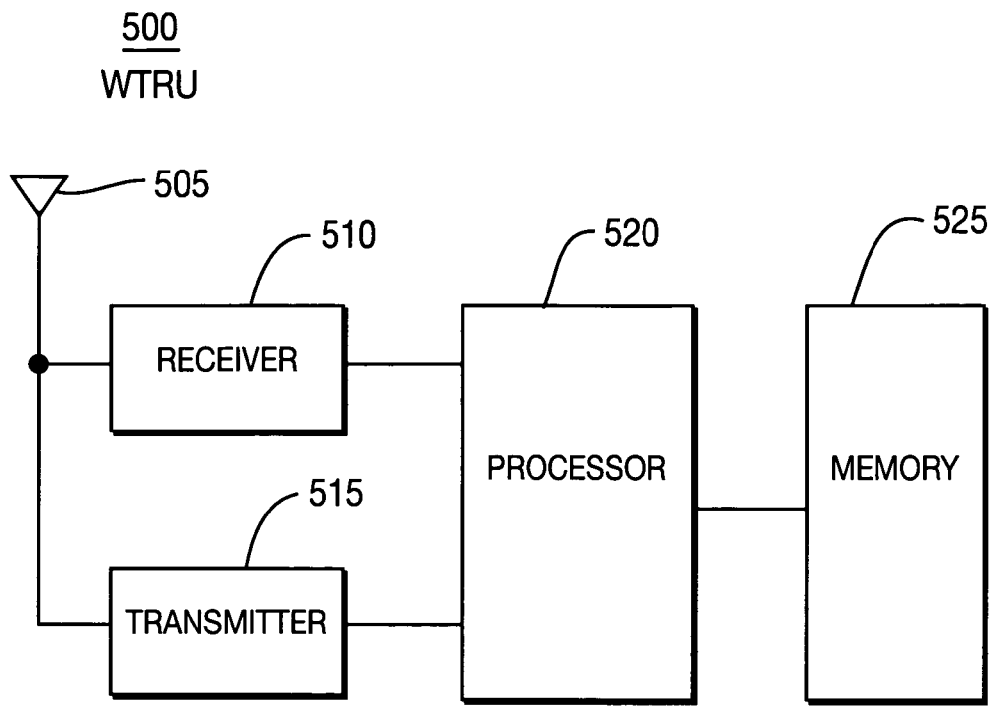
FIG. 5 is a block diagram of a WTRU used to implement the process of FIG. 3 in the system of FIG. 1.

FIG. 5 is a block diagram of a WTRU 500 used to implement the process 300 in the wireless communication system 100. The WTRU 500 includes an antenna 505, a receiver 510, a transmitter 515, a processor 520 and a memory 525. When the WTRU 500 powers up, the receiver 510 scans for a control channel via the antenna 505, and tunes in and listens to a first broadcast channel in the control channel associated with a first network 110. The receiver 510 receives a network compatibility message 120 sent by the first network 110 over the first broadcast channel indicating a particular IP version, (i.e., PDP type), supported by the first network 110. The receiver 510 forwards the network compatibility message 120 to the processor 520 which compares the particular IP version supported by the first network 110 with data, stored in the memory 525, which indicates the IP version of the WTRU 500.

If the processor 520 determines that the IP version of the WTRU 500 is not the same as, (i.e., is not compatible with), the IP version of the first network 110, the processor 520 controls the receiver 510 such that it tunes in and listens to a second broadcast channel associated with a second network 115. The receiver 510 receives a network compatibility message 125 sent by the second network 115 over the second broadcast channel indicating a particular IP version, (i.e., PDP type), supported by the second network.

If the IP version of the WTRU 500 is determined by the processor 520 to be the same as, (i.e., compatible with), the IP version of the first network 110 or the second network 115, the receiver 510, the processor 520, the memory 525 and the transmitter 515 are used to proceed with implementing attach procedures 130, (i.e., registration), to establish a communication link between the WTRU 500 and the compatible network 110, 115.

Figure 6:
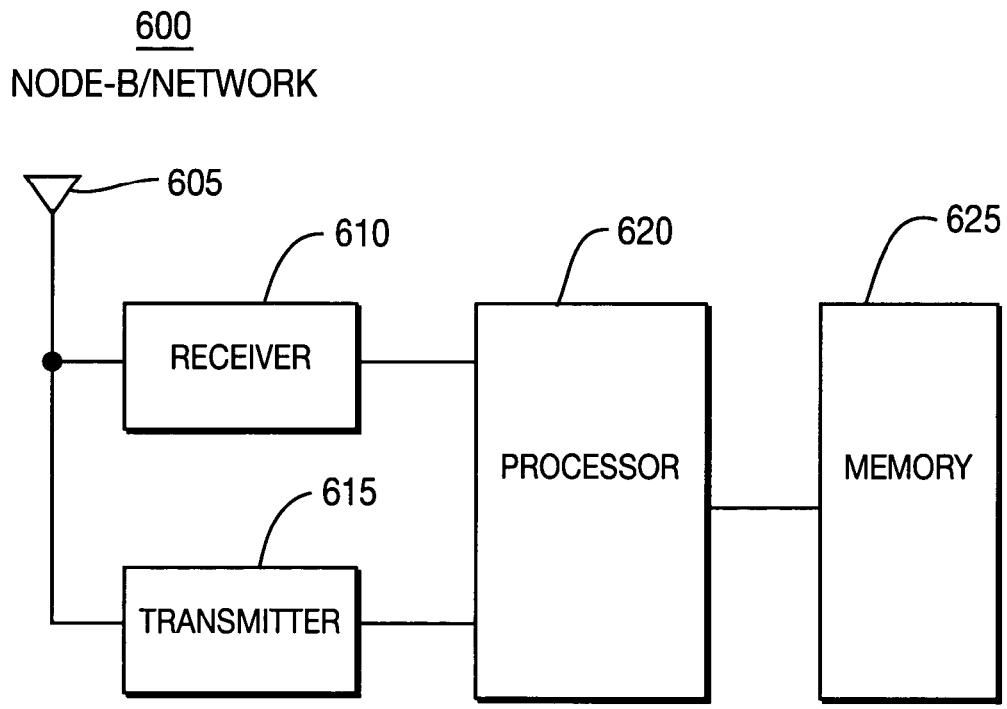
FIG. 6 is a block diagram of a Node-B/network used to implement the process of FIG. 4 in the system of FIG. 2.

FIG. 6 is a block diagram of a Node-B/network 600 used to implement the process 400 in the wireless communication system 200. The Node-B/network 600 includes an antenna 605, a receiver 610, a transmitter 615, a processor 620 and a memory 625. The receiver 610 receives an attach request message 205 from the WTRU 105' over the broadcast channel via the antenna 605. The attach request message 205 indicates a particular IP version, (i.e., PDP type), supported by the WTRU 105'. The receiver 610 forwards the attach request message 205 to the processor 620 which compares the particular IP version supported by the WTRU 105' with data, stored in the memory 625, which indicates the IP version of the Node-B/network 600.

If the processor 620 determines that the IP version of the Node-B/network 600 is not the same as, (i.e., is not compatible with), the IP version of the WTRU 105', the processor 620 controls the transmitter 615 to send a message 215 indicating that the attach request has been denied.

If the IP version of the WTRU 105' is determined by the processor 620 to be the same as, (i.e., compatible with), the IP version of the Node-B/network 600, the receiver 610, the processor 620, the memory 625 and the transmitter 615 are used to proceed with implementing attach procedures, (i.e., registration), to establish a communication link between the WTRU 105' and the Node-B/network 600.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method of determining whether attach procedures should be implemented based on Internet protocol (IP) version compatibility, the method comprising:
   storing a list of network identifiers;
   scanning a control channel, monitoring a plurality of network broadcast channels and selecting a network having an identifier that matches one of the stored identifiers, wherein the scanning, monitoring and selecting is performed by a processor;
   on a condition that more than one match occurs, processing additional stored priority information and selecting a first network having the highest priority; and
   on a condition that a match does not occur, continuing to scan the control channel;
   receiving a first network IP version message from a the first network over a first broadcast channel which includes a field having a plurality of bits representing a first packet data protocol (PDP) type, wherein the first network IP version message indicates the IP version that the first network supports;
   on a condition that the first PDP type of the first network is not compatible, based on the IP version message, with a second PDP type supported by a wireless transmit/receive unit (WTRU), receiving a signal from the first network directing the WTRU to a second network known to be compatible with the IP version of the WTRU or tuning to and monitoring other broadcast channels in the control channel until a second network IP version message is received from a second network over a second broadcast channel which includes a field having a plurality of bits representing the second PDP type, wherein the second network IP version message indicates the IP version that the second network supports; and
   implementing attach procedures to establish a communication link between the WTRU and the second network.

2. The method of claim 1 wherein the first network includes a serving general packet radio service (GPRS) support node (SGSN).

3. The method of claim 1 wherein the second network is a public land mobile network (PLMN).

4. The method of claim 1 wherein the PDP type is represented by two bits "00" indicating that the first network supports IP version 4.

5. The method of claim 1 wherein the PDP type is represented by two bits "01" indicating that the first network supports IP version 6.

6. The method of claim 1 wherein the PDP type is represented by two bits "10" indicating that the first network supports both IP version 4 and IP version 6.

7. The method of claim 1 wherein the PDP type is represented by two bits "00" indicating that the second network supports IP version 4.

8. The method of claim 1 wherein the PDP type is represented by two bits "01" indicating that the second network supports IP version 6.

9. The method of claim 1 wherein the PDP type is represented by two bits "10" indicating that the second network supports both IP version 4 and IP version 6.

10. A wireless transmit/receive unit (WTRU) for determining whether attach procedures should be implemented based on Internet protocol (IP) version compatibility, the WTRU comprising:
    a memory configured to store a list of network identifiers;
    a processor configured to scan the control channel, monitor a plurality of network broadcast channels and select a first network having an identifier that matches one of the identifier stored in the memory;
    on a condition that more than one match occurs, the processor is further configured to process additional priority information stored in the memory, and to select the network having the highest priority; and
    on a condition that a match does not occur, the processor is further configured to continue to scan the control channel;
    a receiver configured to receive a first network IP version message from the first network over a first broadcast channel which includes a field having a plurality of bits representing a first packet data protocol (PDP) type, wherein the first network IP version message indicates the IP version that the first network supports;
    on a condition that the first PDP type of the first network is not compatible, based on the IP version message, with a second PDP type supported by the WTRU, the receiver further configured to receive a signal from the first network directing the WTRU to a second network known to be compatible with the IP version of the WTRU or to tune to and monitor other broadcast channels in the control channel until a second network IP version message is received from a second network over a second broadcast channel which includes a field having a plurality of bits representing the second PDP type, wherein the second network IP version message indicates the IP version that the second network supports; and the processor further configured to implement attach procedures to establish a communication link between the WTRU and the second network.

11. The WTRU of claim 10 wherein the first network includes a serving general packet radio service (GPRS) support node (SGSN).

12. The WTRU of claim 10 wherein the second network is a public land mobile network (PLMN).

13. The WTRU of claim 10 wherein the PDP type is represented by two bits "00" indicating that the first network supports IP version 4.

14. The WTRU of claim 10 wherein the PDP type is represented by two bits "01" indicating that the first network supports IP version 6.

15. The WTRU of claim 10 wherein the PDP type is represented by two bits "10" indicating that the first network supports both IP version 4 and IP version 6.

16. The WTRU of claim 10 wherein the PDP type is represented by two bits "00" indicating that the second network supports IP version 4.

17. The WTRU of claim 10 wherein the PDP type is represented by two bits "01" indicating that the second network supports IP version 6.

18. The WTRU of claim 10 wherein the PDP type is represented by two bits "10" indicating that the second network supports both IP version 4 and IP version 6.

* * * * *